Feb. 25, 1930.  W. A. MEADOR  1,748,517
GROUND CONTROL MEANS FOR AEROPLANES
Filed Feb. 11, 1929
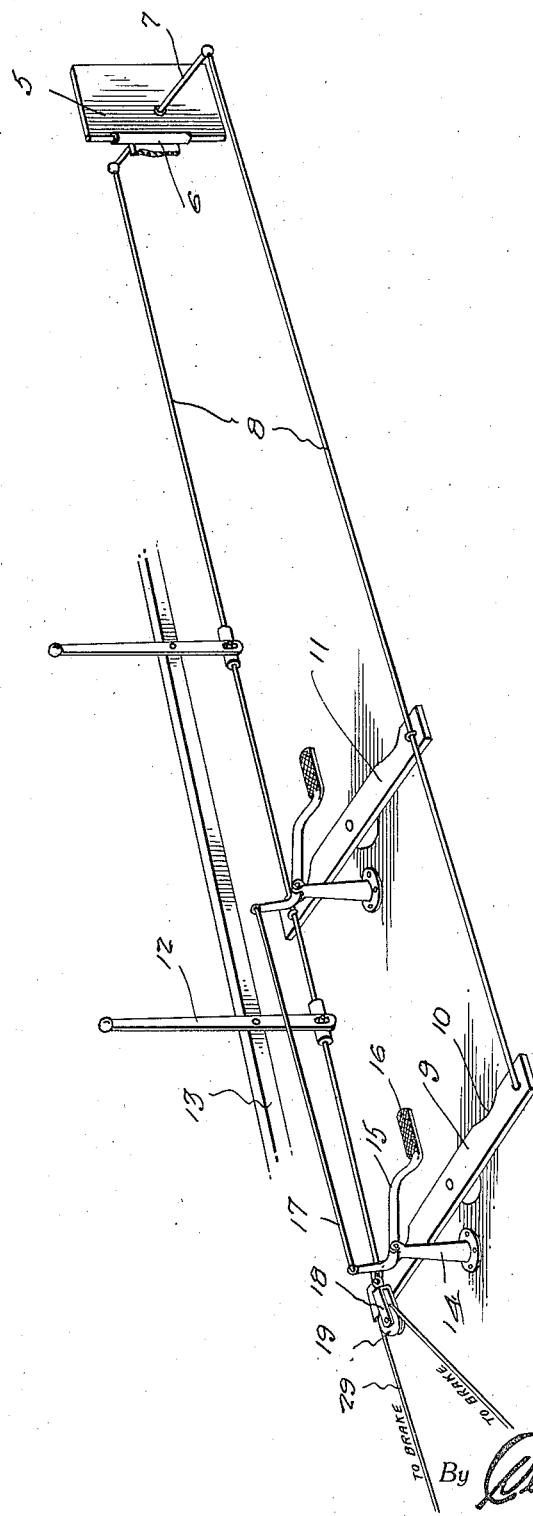
Inventor
Walter A. Meador
By Clarence A. O'Brien
Attorney Patented Feb. 25, 1930

1,748,517

UNITED STATES PATENT OFFICE

WALTER A. MEADOR, OF GALLATIN, TENNESSEE, ASSIGNOR OF ONE-HALF TO HARRY J. RENN, OF GALLATIN, TENNESSEE

GROUND CONTROL MEANS FOR AEROPLANES

Application filed February 11, 1929. Serial No. 339,114.

The present invention relates to aeroplanes and more particulary to means for controlling the movement and direction of the areoplane when upon the ground.

One of the important objects of the invention is to provide dual control means for the rudder of the aeroplane whereby to enable the same to be steered either by hand or by foot, and on land or in the air.

A further important object is to provide a service brake operating pedal for the aeroplane positioned in such a manner as to permit the operation of the service brake by either foot of the operator and positioned with respect to the foot control means of the rudder so that the operator may conveniently shift either of his feet from the rudder control to the service brake pedal with a minimum amount of trouble and effort.

Another important object is to provide extensions for both the rudder control and the service brake pedal so that the aeroplane may be controlled either from the forward or rear cockpit.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

The figure is a perspective view illustrating the dual control means for the rudder with the service brake pedal shown in operative position relative thereto.

Referring to the drawing in detail, the invention comprises the usual rudder 5 pivotally mounted on a rudder post 6 in a manner well known in the art. A pair of rods 7 extend outwardly from the opposite sides of the rudder to which are attached forwardly extending cables 8 at their forward ends to a transversely extending, pivotally mounted foot control stick 9 having notches formed in one edge thereof for receiving the feet of the aviator whereby through the movement of the foot control stick to control the rudder 5.

Intermediate the ends of the cable 8 is also arranged a similar control stick 11 for mounting in the rear cockpit of the aeroplane. A pair of hand control rudder levers 12 are pivotally mounted intermediate their ends to one of the longitudinally extending frame members 13 of the aeroplane and extend vertically in a position for convenient manipulation by aviators in either the forward or rear cockpit and have their lower ends attached to one of the cable wires 8. Their lower bearings being elongated, or oval shaped so as not to stretch wires 8 out of alignment. Levers 12 may be mounted on either right or left side of the plane.

The rudder may be controlled either through the manipulation of the foot sticks 9 and 11 or by means of the hand control levers 12. A pair of pedal posts 14 are secured to the floor of each of the cockpits, immediately forward of each of the foot control sticks 9 and 11, each of said posts having foot pedals 15 pivotally mounted at their upper ends with a foot piece 16 extending rearwardly above the center of the respective rudder control sticks.

The end of the pedal opposite from the foot piece 16 extends forwardly and upwardly and are attached to each other by a connecting rod 17 providing for the movement of the pedals as a unit. To the upper end of the forwardmost pedal 15 is attached a pulley wheel support 18 having a pulley wheel 19 rotatably mounted thereon and about which extends a cable 20 leading to the brake mechanism of the wheels of the aeroplane.

It will thus be apparent that through the depressing action of either of the brake pedals that the brakes carried by the wheels of the aeroplane may be applied in a desired manner for bringing the aeroplane to a stop. Rod 17 may be curved so as not to be in the way of the feet of the operator while operating from the front cockpit.

During the flight of the aeroplane, the rudder 5, provided for steering the aeroplane is usually controlled by the foot sticks 9 or 11 thus leaving the hands of the aviator free for operating other control means. However when landing it is more natural to use the feet for applying the brake mechanism and accordingly the levers 12 may be manipulated by one hand of the aviator for steering the aeroplane while either foot may be applied to the brake pedal 15 for applying the brakes of the wheel.

Through the use of the mechanism thus described it will be apparent that the aeroplane may be easily and conveniently controlled.

It is obvious that my invention is susceptible to various changes and modifications in construction without departing from the spirit of the invention or the scope of the appended claims, and I accordingly claim all such forms of the device to which I am entitled.

The aviator may steer with one hand while in flight and thus stretch or rest his legs and feet.

Having thus described my invention, what I claim as new is:

1. An aeroplane control means comprising in combination, a rudder having foot and hand control means for independently controlling the movement of the rudder and a brake pedal for the brake mechanism of the wheels of the aeroplane operatively mounted in a position immediately above said foot control means and substantially equidistantly between the side edges thereof.

2. An aeroplane control means comprising in combination, a rudder, a pair of operating cables for the rudder extending forwardly therefrom in parallel relation, a plurality of foot control sticks extending transversely of the aeroplane and attached to each of said cables providing independent control means therefor, a plurality of hand control levers attached to one of said cables and a foot brake pedal operatively supported above each of said control sticks and adapted for operation by either foot of the aviator.

In testimony whereof I affix my signature.

WALTER A. MEADOR.